Figure 4:
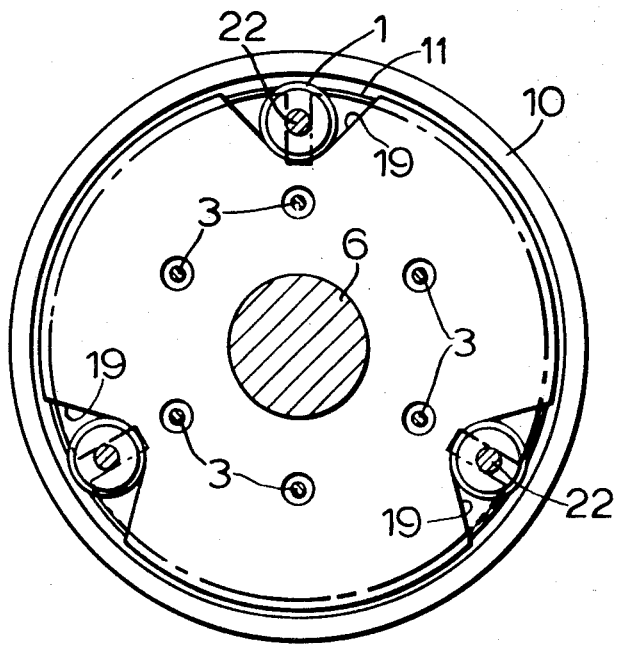

United States Patent

[11] 3,610,379

[72] Inventor Jerzy Leon Courtenay
Wolverhampton, England
[21] Appl. No. 55,433
[22] Filed July 16, 1970
[45] Patented Oct. 5, 1971
[73] Assignee H.M. Hobson Limited
London, England

[54] DOUBLE-ACTING FREEWHEEL FOR THE PROTECTION OF HYDRAULIC MOTORS
5 Claims, 5 Drawing Figs.

[52] U.S. Cl. ................................................. 192/36,
192/38, 192/44, 74/661, 244/83 R
[51] Int. Cl. ........................................................ F16d 41/07,
F16d 41/10, B64c 13/00
[50] Field of Search ............................................ 192/35, 36,
38, 44; 74/661; 244/83 R

[56] References Cited
UNITED STATES PATENTS
1,466,394 8/1923 Fornaca ........................ 74/661

| 3,055,471 | 9/1962 | Warn et al. ................ | 192/38 |
| 3,150,750 | 9/1964 | Georges ..................... | 192/38 |
| 3,300,002 | 1/1967 | Roper ........................ | 192/38 X |
| 3,481,436 | 12/1969 | Wilkowski .................. | 192/38 X |

Primary Examiner—Allan D. Hermann
Attorneys—E. T. Le Gates and Martin Kirkpatrick ABSTRACT: A protective freewheel device, for use in a powered control system for aircraft control surfaces in which the control surface is actuated by a drive unit which derives power from either of a pair of hydraulic motors, said freewheel device comprising an input shaft, an output shaft, an intermediate member coupled by torsion springs to the input shaft, two sets of braking members on the intermediate member which cooperate respectively with a stationary member and with the output shaft and roller means engaging the intermediate member and coacting with cam faces on the input shaft which are effective to shift them from an inoperative position to an operative position in which they transmit a direct drive from the input shaft to the output shaft.

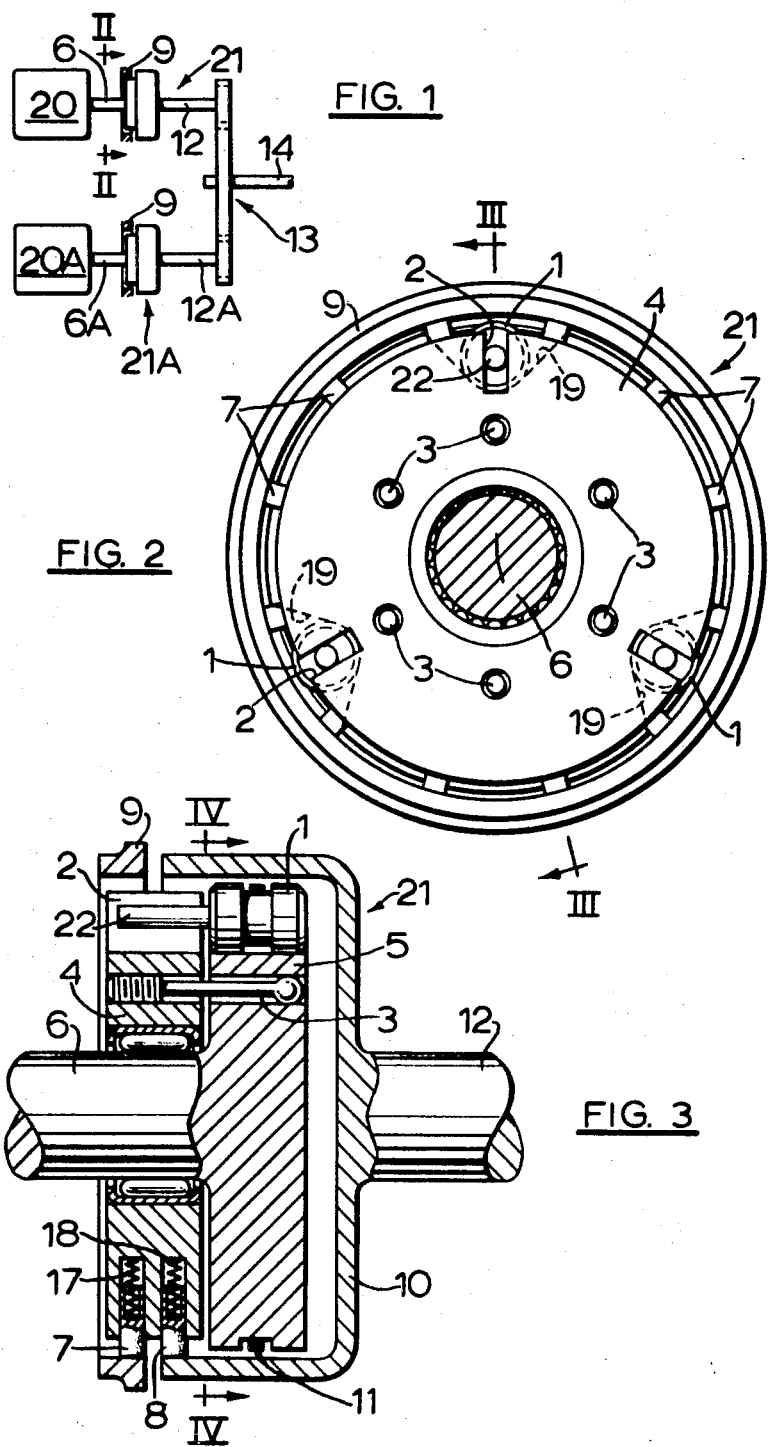

DOUBLE-ACTING FREEWHEEL FOR THE PROTECTION OF HYDRAULIC MOTORS

This invention relates to a protective freewheel device for use in a powered control system for aircraft control surfaces in which the control surface is actuated by a drive unit which derives power from either of a pair of hydraulic motors. It is normal practice in such a system to provide a direct parallel mechanical connection between the two motors, but this has the disadvantage that if the output shaft of one motor seizes the system can become completely ineffective.

In order to avoid this contingency, a freewheel device according to the invention may be fitted to each motor output shaft to enable either to operate with the other stationary.

The freewheel device according to the invention comprises an input shaft, an output shaft, an intermediate member coupled by torsion springs to the input shaft, two sets of braking members on the intermediate member which cooperate respectively with a stationary member and with the output shaft and rollers disposed between the input shaft and the intermediate member and coacting with cam faces on the input shaft which are effective to shift them from an inoperative position to an operative position in which they transmit a direct drive from the input shaft to the output shaft.

Figure 5:
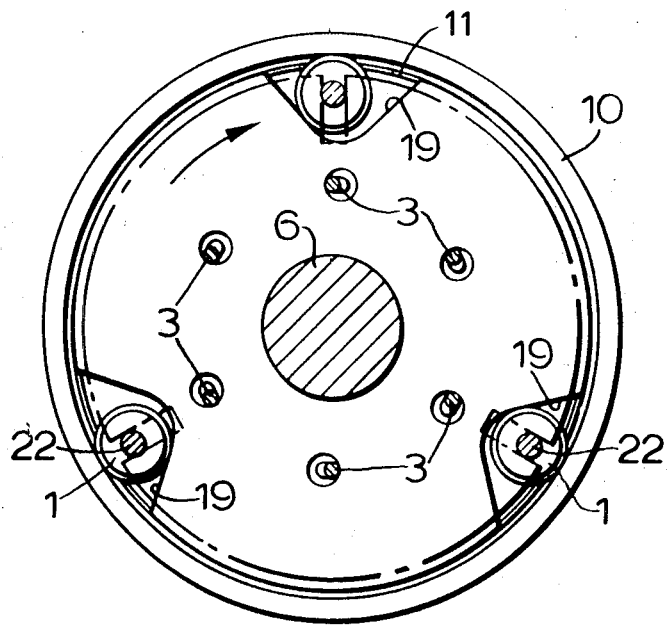

One embodiment of the invention is illustrated in the accompanying drawing, in which:

FIG. 1 is a diagram of a powered control system for an aircraft control surface, FIG. 2 is a section on a larger scale on the line II—II in FIG. 1, FIG. 3 is a section on the line III—III in FIG. 2, FIG. 4 is a section on the line IV—IV in FIG. 3 showing the parts in the freewheeling condition, and FIG. 5 is a similar view showing the parts in the driving condition.

The control system shown in FIG. 1 includes a pair of hydraulic motors 20, 20A which drive the input shafts 6, 6A of freewheel devices 21, 21A, the output shafts 12, 12A of which are connected by gearing 13 to a shaft 14 for operating a flying control surface (not shown).

The input shaft 6 (FIG. 2) of each freewheel device is surrounded by an intermediate member 4 which in turn is surrounded by a casing 10 attached to the output shaft 12. The intermediate member 4 carries two rows of radially disposed locking plungers 7 and 8, which are urged outwardly by springs 17, 18 and is coupled to the input shaft 6 by six torsion springs 3.

The row of plungers 7 provides frictional drag between the intermediate member 4 and a stationary collar 9, while the row of plungers 8 provides an identical amount of drag between the intermediate member 4 and the casing 10.

The torsional constraint provided between the parts 4 and 6 by the springs 3 exceeds any difference which may exist in the friction between the two rows of spring-loaded plungers 7 and 8 and their respective mating surfaces on the parts 9 and 10.

Three rollers 1 are cradled in V-shaped recesses 19 in the periphery of a flange 5 on the input shaft 6 and have extensions 22 engaging radial slots 2 in the member 4. A light annular spring 11 prevents gravitation from causing the rollers 1 to fall freely on to the casing 10.

The use of two rows of friction plungers 7, 8 on the intermediate member 4 (one row making contact with the casing 10 attached to the output shaft 12 and the other row making contact with the stationary collar 9), enables the following requirements to be satisfied.

1. Sufficient friction is available from the two rows of plungers to overcome the stiffness of the springs 3 when normal drive is required.
2. Sufficient spring force is available to center the rollers 1 when the other motor operates following a seizure of the normal drive.

Operation is as follows under normal conditions when the input shaft 6 is required to drive the output shaft 12.

When the input shaft 6 commences to rotate, the springs 3 flex while the intermediate member 4 remains stationary due to the friction of plungers 7 and 8 acting on the collar 9 and the casing 10. The rollers 1 are therefore prevented from being carried round with input shaft 6 but merely rise up one face of the V-shaped recesses 19 until they touch the casing 10 as shown in FIG. 5. A positive drive is then established between the input and the output shafts due to the spragging action of the rollers. The intermediate member 4 is then dragged round against the friction exerted by the plungers 7 on the collar 9 but there is insufficient torsion available from the springs 3 to disconnect the driving rollers 1.

If the input shaft is subsequently stopped and restarted in the opposite direction, the rollers 1 are released from the face of the casing 10 and engagement of the drive is established as just described but with each roller 1 positioned on the other face of its V-shaped recess 19.

The input shaft 6 can therefore normally drive the output shaft 12 in either direction.

If the driving motor seizes during normal drive and the second motor is invoked, there are two possibilities to be considered.

Firstly, the second motor could be required to continue to drive the output shaft in the same direction. In this case the natural tendency would be for the rollers 1 on the assembly associated with the seized motor to roll down the faces of the recesses 19 to the position shown in FIG. 4. They will be assisted in this tendency by the torsional relaxation of the springs 3. Although this relaxing force is small it is effective because the intermediate member 4 is experiencing almost equal but opposite frictional forces on it. These frictional forces are derived from the braking effect of the collar 9 on it through the plungers 7 and the driving effect from the casing 10 on it through the plungers 8. The latter driving effect acts in the same sense as the relaxing springs.

Once the rollers 1 are disconnected from the casing 10 the torsional constraint due to the springs 3 is sufficient to maintain disconnection. The second motor is then able to rotate in either direction without experiencing any drag from the seizure of the first motor other than a small amount from the friction of the pistons 8 on the casing 10.

Secondly, the second motor could be required to drive the output in the reverse direction from that which was being demanded of the first motor immediately before it seized.

In this case the natural tendency would be for the rollers 1 on the assembly associated with the seized motor to engage the casing 10 more firmly and prevent the drive from the second motor from being transmitted to the control surface. In order for the second motor to be effective it is necessary for the pilot to unlock the drive mechanism of the freewheel associated with the seized motor. This he can do by first demanding a very small output displacement in the same sense as the first motor was producing prior to its seizure. This will return the parts to the position of FIG. 4 and the second motor can again drive in either direction without experiencing any significant drag from the seized motor.

The double-acting freewheel device described may be applied to the outputs of any duplicated hydraulic motors for either direction of rotation. When installed with directly coupled hydraulic motors, should one motor fail the unit will enable the other motor to drive the system without damage to the seized motor. The device will, moreover, react the full output torque from each motor.

What I claim as my invention and desire to secure by Letter Patent is:

1. A protective freewheel device, for use in a powered control system for aircraft control surfaces in which the control surface is actuated by a drive unit which derives power from either of a pair of hydraulic motors, said freewheel device comprising an input shaft, an output shaft, an intermediate member coupled by torsion springs to the input shaft, two sets of braking members on the intermediate member which cooperate respectively with a stationary member and with the output shaft and roller means engaging the intermediate member and coacting with cam faces on the input shaft which are effective to shift them from an inoperative position to an operative position in which they transmit a direct drive from the input shaft to the output shaft.

2. A device as claimed in claim 1, in which the roller means includes rollers accommodated in V-shaped recesses in the periphery of a flange on the input shaft and extensions engaging radial slots in the intermediate member.

3. A device as claimed in claim 2, in which the braking members are constituted by spring pressed plungers carried by the intermediate member.

4. A powered control system for operating an aircraft control surface which includes a pair of hydraulic motors, each of which is connected to a common drive shaft by a freewheel device as claimed in claim 1.

5. A device as claimed in claim 1 in which the braking members are constituted by spring pressed plungers carried by the intermediate member.